(12) United States Patent
Maeno et al.

(10) Patent No.: US 11,400,521 B2
(45) Date of Patent: Aug. 2, 2022

(54) CUTTING INSERT

(71) Applicant: SUMITOMO ELECTRIC HARDMETAL CORP., Itami (JP)

(72) Inventors: Hideo Maeno, Itami (JP); Takahiro Okuno, Itami (JP); Naoki Matsuda, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 366 days.

(21) Appl. No.: 16/480,439

(22) PCT Filed: Sep. 6, 2018

(86) PCT No.: PCT/JP2018/033001
§ 371 (c)(1),
(2) Date: Jul. 24, 2019

(87) PCT Pub. No.: WO2020/049678
PCT Pub. Date: Mar. 12, 2020

(65) Prior Publication Data
US 2021/0086269 A1  Mar. 25, 2021

(51) Int. Cl.
*B23B 27/16* (2006.01)
*B23B 27/22* (2006.01)

(52) U.S. Cl.
CPC ... *B23B 27/1611* (2013.01); *B23B 2200/0447* (2013.01); *B23B 2200/08* (2013.01); *B23B 2200/081* (2013.01)

(58) Field of Classification Search
CPC ............ B23C 5/2217; B23C 2200/323; B23C 2200/081; B23C 5/205; B23B 2200/321; B23B 2200/081; B23B 2200/201; B23B 27/143; B23B 27/1618; B23B 27/1637; B23B 27/1648; B23B 2200/087;
(Continued)

(56) References Cited

U.S. PATENT DOCUMENTS

| D794,103 S | * | 8/2017 | Jeong | ............................. D15/139 |
| 10,086,436 B2 | * | 10/2018 | Sasaki | .................... B23B 27/141 |
| 2011/0142555 A1 | | 6/2011 | Yamazaki et al. | |

(Continued)

FOREIGN PATENT DOCUMENTS

| EP | 2 570 211 A1 | 3/2013 | |
| EP | 2570211 A1 * | 3/2013 | ......... B23B 27/1607 |

(Continued)

*Primary Examiner* — Sara Addisu
(74) *Attorney, Agent, or Firm* — Faegre Drinker Biddle & Reath LLP

(57) ABSTRACT

A cutting insert has a top surface, a seating surface, and an outer peripheral surface. The cutting edge includes a corner cutting edge portion, a first cutting edge portion, and a second cutting edge portion. The top surface includes a first rake face, a second rake face, a third rake face, a front side surface, an upper surface, a first side surface, and a second side surface. A ridgeline between the first side surface and the second side surface is continuous to the upper surface. When seen in a direction perpendicular to the seating surface, a width of a boundary between the front side surface and the third rake face is larger than a width of a boundary between the front side surface and the upper surface.

6 Claims, 14 Drawing Sheets

(58) Field of Classification Search
CPC ...... B23B 2200/166; B23B 2200/0447; B23B 2200/08; B23B 27/1611
See application file for complete search history.

(56) References Cited

U.S. PATENT DOCUMENTS

2015/0078844 A1   3/2015   Majima et al.
2017/0209935 A1   7/2017   Furusawa
2019/0039152 A1   2/2019   Ikeda

FOREIGN PATENT DOCUMENTS

| JP | 2008-837 A | 1/2008 |
| WO | WO-2011/142297 A1 | 11/2011 |
| WO | WO-2016/017470 A1 | 2/2016 |
| WO | WO 2017/135469 A1 | 8/2017 |

\* cited by examiner

CUTTING INSERT

TECHNICAL FIELD

The present disclosure relates to a cutting insert.

BACKGROUND ART

WO 2016/017470 (Patent Literature 1) describes a cutting insert having a corner cutting edge, a first rake face, a second rake face, and a raised portion. The second rake face is located between the corner cutting edge and the raised portion and is depressed relative to the first rake face.

CITATION LIST

Patent Literature

PTL 1: WO 2016/017470

SUMMARY OF INVENTION

A cutting insert according to the present disclosure includes a top surface, a seating surface, and an outer peripheral surface. The seating surface is located opposite to the top surface. The outer peripheral surface is continuous to each of the top surface and the seating surface. A ridgeline between the top surface and the outer peripheral surface constitutes a cutting edge. The cutting edge includes: a corner cutting edge portion having a curved shape; a first cutting edge portion having a straight shape and continuous to one end of the corner cutting edge portion; and a second cutting edge portion having a straight shape and continuous to the other end of the corner cutting edge portion. The top surface includes a first rake face, a second rake face, a third rake face, a front side surface, an upper surface, a first side surface, and a second side surface. The first rake face is continuous to the first cutting edge portion. The second rake face is continuous to the second cutting edge portion. The third rake face is continuous to the corner cutting edge portion and is continuous to each of the first rake face and the second rake face. The front side surface is located opposite to the corner cutting edge portion relative to the third rake face, and rises from the third rake face. The upper surface is located opposite to the third rake face relative to the front side surface, and is continuous to the front side surface. The first side surface is located opposite to the first cutting edge portion relative to the first rake face, and rises from the first rake face. The second side surface is located opposite to the first rake face relative to the first side surface, is inclined relative to the first side surface, and is continuous to each of the first side surface, the front side surface, and the upper surface. A ridgeline between the first side surface and the second side surface is continuous to the upper surface. When seen in a direction perpendicular to the seating surface, a width of a boundary between the front side surface and the third rake face is larger than a width of a boundary between the front side surface and the upper surface.

DETAILED DESCRIPTION

Figure 1:
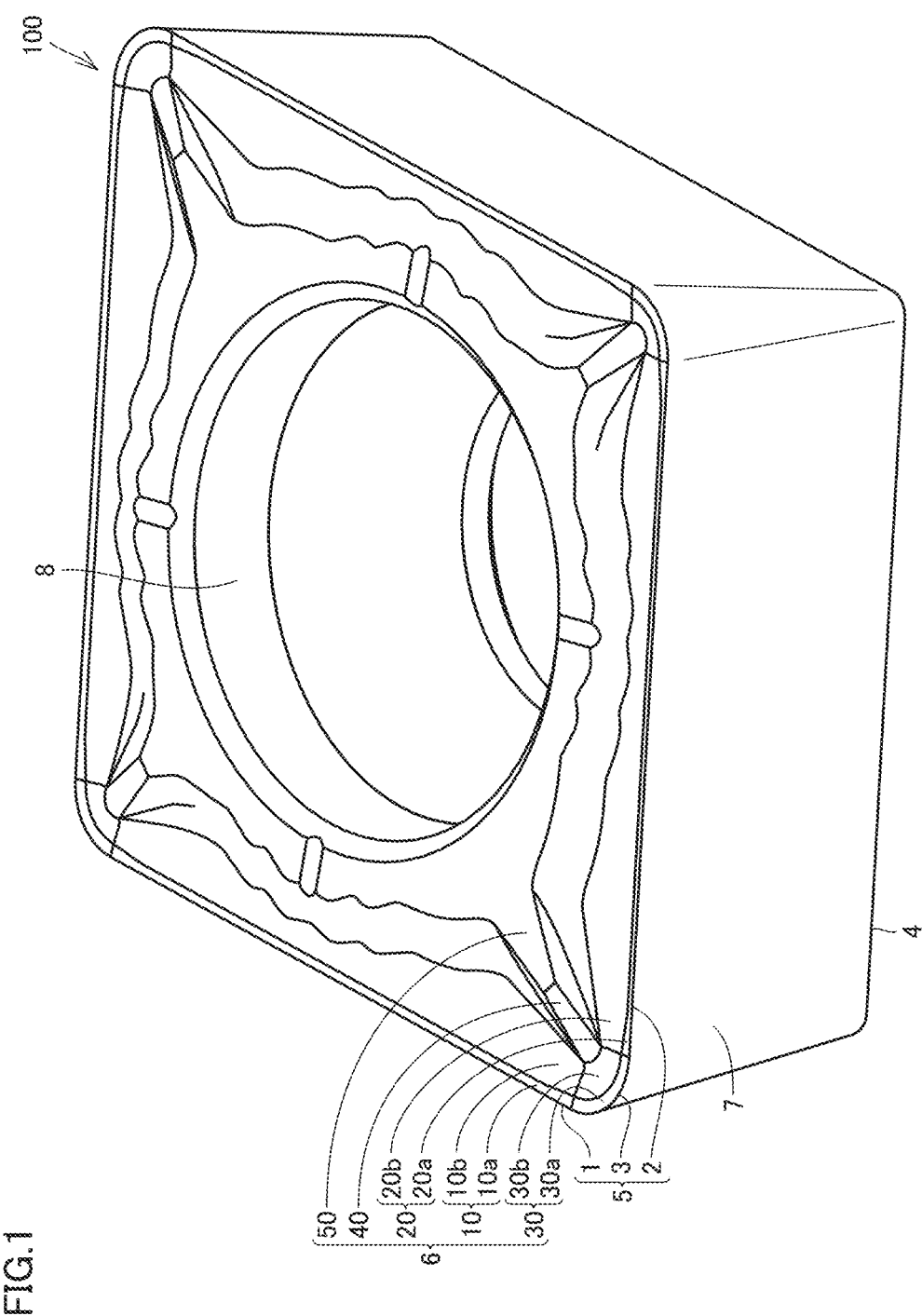
FIG. 1 is a schematic perspective view showing a configuration of a cutting insert according to the present embodiment.

Problem to be Solved by the Present Disclosure

In the cutting insert described in WO 2016/017470 (Patent Literature 1), it cannot be said that versatility for process conditions is sufficiently high.

An object of the present disclosure is to provide a cutting insert with which versatility for process conditions can be improved.

Advantageous Effect of the Present Disclosure

According to the present disclosure, there can be provided a cutting insert with which versatility for process conditions can be improved.

DESCRIPTION OF EMBODIMENTS

First, the following describes a summary of embodiments of the present disclosure.

(1) A cutting insert 100 according to the present disclosure includes a top surface 6, a seating surface 4, and an outer peripheral surface 7. Seating surface 4 is located opposite to top surface 6. Outer peripheral surface 7 is continuous to each of top surface 6 and seating surface 4. A ridgeline between top surface 6 and outer peripheral surface 7 constitutes a cutting edge 5. Cutting edge 5 includes: a corner cutting edge portion 3 having a curved shape; a first cutting edge portion 1 having a straight shape and continuous to one end of corner cutting edge portion 3; and a second cutting edge portion 2 having a straight shape and continuous to the other end of corner cutting edge portion 3. Top surface 6 includes a first rake face 10, a second rake face 20, a third rake face 30, a front side surface 40, an upper surface 50, a first side surface 11, and a second side surface 12. First rake face 10 is continuous to first cutting edge portion 1. Second rake face 20 is continuous to second cutting edge portion 2. Third rake face 30 is continuous to corner cutting edge portion 3 and is continuous to each of first rake face 10 and second rake face 20. Front side surface 40 is located opposite to corner cutting edge portion 3 relative to third rake face 30, and rises from third rake face 30. Upper surface 50 is located opposite to third rake face 30 relative to front side surface 40, and is continuous to front side surface 40. First side surface 11 is located opposite to first cutting edge portion 1 relative to first rake face 10, and rises from first rake face 10. Second side surface 12 is located opposite to first rake face 10 relative to first side surface 11, is inclined relative to first side surface 11, and is continuous to each of first side surface 11, front side surface 40, and upper surface 50. A ridgeline between first side surface 11 and second side surface 12 is continuous to upper surface 50. When seen in a direction perpendicular to seating surface 4, a width of a boundary between front side surface 40 and third rake face 30 is larger than a width of a boundary between front side surface 40 and upper surface 50.

(2) According to cutting insert 100 according to (1), in a cross section that is perpendicular to seating surface 4 and that is perpendicular to a straight line bisecting an angle between a straight line along first cutting edge portion 1 and a straight line along second cutting edge portion 2, an inclination angle of second side surface 12 relative to seating surface 4 may be larger than an inclination angle of first side surface 11 relative to seating surface 4.

(3) According to cutting insert 100 according to (1) or (2), in a case where a first position 61 represents a point at which front side surface 40, first side surface 11, and second side surface 12 cross one another, a second position 62 represents a point at which front side surface 40, second side surface 12, and upper surface 50 cross one another, and a third position 63 represents a point at which first side surface 11, second side surface 12, and upper surface 50 cross one another, when seen in the direction perpendicular to seating surface 4, a width of second side surface 12 in a direction perpendicular to first cutting edge portion 1 may become wider as second side surface 12 extends from first position 61 toward second position 62, and may become narrower as second side surface 12 extends from second position 62 toward third position 63.

(4) According to cutting insert 100 according to (3), when seen in the direction perpendicular to seating surface 4, a width of first side surface 11 in the direction perpendicular to first cutting edge portion 1 may become wider as first side surface 11 extends from first position 61 toward third position 63.

(5) According to cutting insert 100 according to any one of (1) to (4), when seen in the direction perpendicular to seating surface 4, a width of first rake face 10 in a direction perpendicular to first cutting edge portion 1 may become wider as first rake face 10 is further away from third rake face 30.

(6) According to cutting insert 100 according to any one of (1) to (5), in a direction along a straight line bisecting an angle between a straight line along first cutting edge portion 1 and a straight line along second cutting edge portion 2, a width of third rake face 30 may be less than or equal to 0.5 mm.

DETAILS OF EMBODIMENTS OF THE PRESENT DISCLOSURE

Next, the following describes details of the embodiments of the present disclosure based on figures. It should be noted that in the below-mentioned figures, the same or corresponding portions are given the same reference characters and are not described repeatedly.

First, the following describes a configuration of a cutting insert according to the present embodiment. FIG. 1 is a schematic perspective view showing a configuration of the cutting insert according to the present embodiment.

As shown in FIG. 1, cutting insert 100 according to the present embodiment mainly has a top surface 6, a seating surface 4, and an outer peripheral surface 7, and is provided with a mounting hole 8. Seating surface 4 is located opposite to top surface 6. Seating surface 4 is a surface of cutting insert 100 to be mounted to a holder (not shown). Seating surface 4 is a flat surface. Outer peripheral surface 7 is continuous to each of top surface 6 and seating surface 4. Mounting hole 8 extends between top surface 6 and seating surface 4. Outer peripheral surface 7 surrounds mounting hole 8. A ridgeline between top surface 6 and outer peripheral surface 7 constitutes a cutting edge 5.

Figure 2:
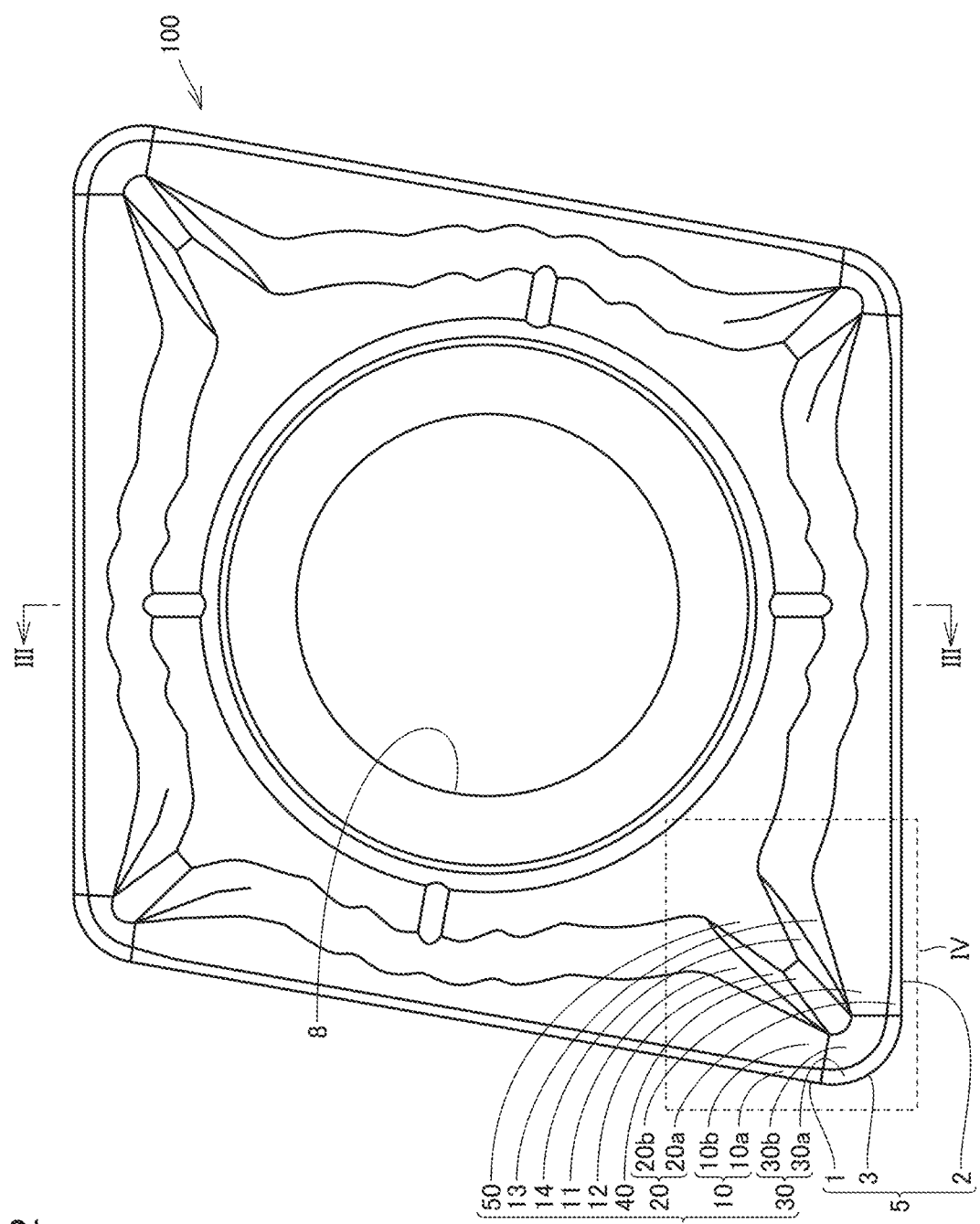
FIG. 2 is a schematic plan view showing the configuration of the cutting insert according to the present embodiment.

FIG. 2 is a schematic plan view showing the configuration of the cutting insert according to the present embodiment. As shown in FIG. 2, when seen in a direction perpendicular to seating surface 4, the outer shape of top surface 6 is in the form of a rhombus, for example. When the outer shape of top surface 6 is in the form of a rhombus, each of vicinities of the vertexes of acute angles of the rhombus is used as cutting edge 5. Top surface 6 mainly has a first rake face 10, a second rake face 20, a third rake face 30, and a protrusion 41.

Figure 3:
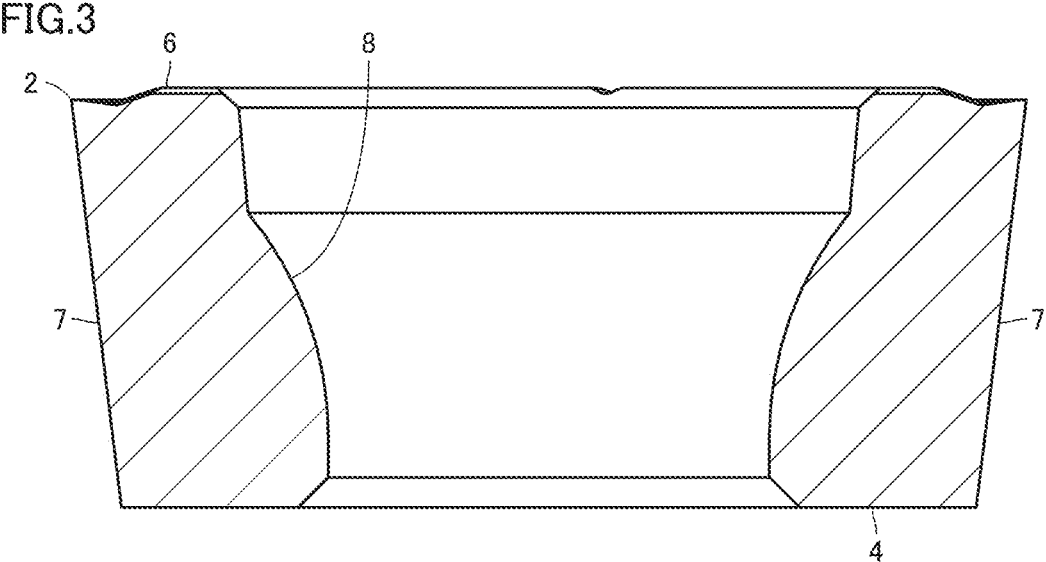
FIG. 3 is a schematic cross sectional view along a line of FIG. 2.

FIG. 3 is a schematic cross sectional view along a III-III line of FIG. 2. As shown in FIG. 3, when seen in the cross section, outer peripheral surface 7 has a tapered shape, for example. Outer peripheral surface 7 is inclined such that the width of outer peripheral surface 7 becomes smaller as outer peripheral surface 7 extends from top surface 6 toward seating surface 4, for example. Mounting hole 8 is open at each of top surface 6 and seating surface 4. Mounting hole 8 is a through hole. The diameter of mounting hole 8 in top surface 6 is larger than the diameter of mounting hole 8 in seating surface 4.

Figure 4:
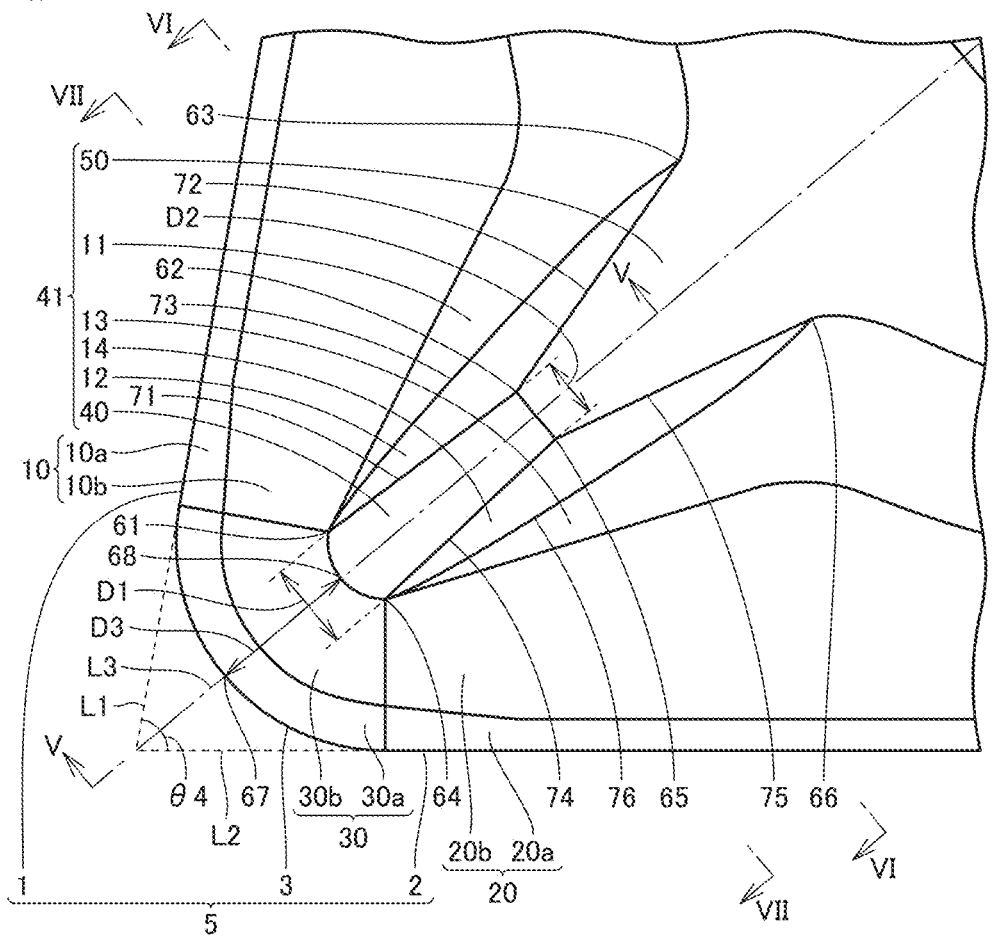
FIG. 4 is a schematic enlarged plan view of a region IV of FIG. 2.

FIG. 4 is a schematic enlarged plan view of a region IV of FIG. 2. As shown in FIG. 4, cutting edge 5 includes a corner cutting edge portion 3, a first cutting edge portion 1, and a second cutting edge portion 2. First rake face 10 is continuous to first cutting edge portion 1. Second rake face 20 is continuous to second cutting edge portion 2. Third rake face 30 is continuous to corner cutting edge portion 3. Third rake face 30 is continuous to each of first rake face 10 and second rake face 20. Third rake face 30 is located between first rake face 10 and second rake face 20. A ridgeline between outer peripheral surface 7 and first rake face 10 constitutes first cutting edge portion 1. A ridgeline between outer peripheral surface 7 and second rake face 20 constitutes second cutting edge portion 2. A ridgeline between outer peripheral surface 7 and third rake face 30 constitutes corner cutting edge portion 3. Outer peripheral surface 7 serves as a flank face. A flank angle is 5°, 7°, or 11°, for example.

As shown in FIG. 4, when seen in the direction perpendicular to seating surface 4, corner cutting edge portion 3 has a curved shape. First cutting edge portion 1 has a straight shape. First cutting edge portion 1 is continuous to one end of corner cutting edge portion 3. Second cutting edge portion 2 has a straight shape. Second cutting edge portion 2 is continuous to the other end of corner cutting edge portion 3. Corner cutting edge portion 3 is located between first cutting edge portion 1 and second cutting edge portion 2.

As shown in FIG. 4, protrusion 41 has a front side surface 40, an upper surface 50, a first side surface 11, a second side surface 12, a third side surface 13, and a fourth side surface 14. Front side surface 40 is located opposite to corner cutting edge portion 3 relative to third rake face 30. Third rake face 30 is located between corner cutting edge portion 3 and front side surface 40. Front side surface 40 rises from third rake face 30. Front side surface 40 may be a flat surface or may be a curved surface. Upper surface 50 is located opposite to third rake face 30 relative to front side surface 40. Front side surface 40 is located between third rake face 30 and upper surface 50. Upper surface 50 is continuous to front side surface 40. Upper surface 50 is a flat surface.

As shown in FIG. 4, first side surface 11 is located opposite to first cutting edge portion 1 relative to first rake face 10. First rake face 10 is located between first cutting edge portion 1 and first side surface 11. First side surface 11 rises from first rake face 10. Second side surface 12 is located opposite to first rake face 10 relative to first side surface 11. First side surface 11 is located between first rake face 10 and second side surface 12. Second side surface 12 is inclined relative to first side surface 11. Second side surface 12 is continuous to each of first side surface 11, front side surface 40, and upper surface 50. A ridgeline (first ridgeline 71) between second side surface 12 and front side surface 40 is continuous to a ridgeline (second ridgeline 72) between second side surface 12 and upper surface 50. A ridgeline (third ridgeline 73) between first side surface 11 and second side surface 12 is continuous to upper surface 50. Third ridgeline 73 is continuous to each of first ridgeline 71 and second ridgeline 72.

As shown in FIG. 4, third side surface 13 is located opposite to second cutting edge portion 2 relative to second rake face 20. Second rake face 20 is located between second cutting edge portion 2 and third side surface 13. Third side surface 13 rises from second rake face 20. Fourth side surface 14 is located opposite to second rake face 20 relative to third side surface 13. Third side surface 13 is located between second rake face 20 and fourth side surface 14. Fourth side surface 14 is inclined relative to third side surface 13. Fourth side surface 14 is continuous to each of third side surface 13, front side surface 40, and upper surface 50. A ridgeline (fourth ridgeline 74) between fourth side surface 14 and front side surface 40 is continuous to a ridgeline (fifth ridgeline 75) between fourth side surface 14 and upper surface 50. A ridgeline (sixth ridgeline 76) between third side surface 13 and fourth side surface 14 is continuous to upper surface 50. Sixth ridgeline 76 is continuous to each of fourth ridgeline 74 and fifth ridgeline 75.

As shown in FIG. 4, when seen in the direction perpendicular to seating surface 4, each of front side surface 40 and upper surface 50 is located between second side surface 12 and fourth side surface 14. Top surface 6 may have a first position 61, a second position 62, and a third position 63. First position 61 is a point at which front side surface 40, first side surface 11, and second side surface 12 cross one another. Second position 62 is a point at which front side surface 40, second side surface 12, and upper surface 50 cross one another. Third position 63 is a point at which first side surface 11, second side surface 12, and upper surface 50 cross one another. First position 61 may be in contact with third rake face 30. When seen in the direction perpendicular to seating surface 4, the width of second side surface 12 in the direction perpendicular to first cutting edge portion 1 may become wider as second side surface 12 extends from first position 61 toward second position 62, and may become narrower as second side surface 12 extends from second position 62 toward third position 63. Specifically, when seen in the direction perpendicular to seating surface 4, second side surface 12 may have a triangular shape.

When seen in the direction perpendicular to seating surface 4, the width of first side surface 11 in the direction perpendicular to first cutting edge portion 1 may become wider as first side surface 11 extends from first position 61 toward third position 63. When seen in the direction perpendicular to seating surface 4, the width of first rake face 10 in the direction perpendicular to first cutting edge portion 1 may become wider as first rake face 10 is further away from third rake face 30. From another viewpoint, it is said that when seen in the direction perpendicular to seating surface 4, a distance between first cutting edge portion 1 and protrusion 41 in the direction perpendicular to first cutting edge portion 1 may become larger as first cutting edge portion 1 is further away from corner cutting edge portion 3.

As shown in FIG. 4, top surface 6 may have a fourth position 64, a fifth position 65, and a sixth position 66. Fourth position 64 is a point at which front side surface 40, third side surface 13, and fourth side surface 14 cross one another. Fifth position 65 is a point at which front side surface 40, third side surface 13, and upper surface 50 cross one another. Sixth position 66 is a point at which third side surface 13, fourth side surface 14, and upper surface 50 cross one another. Fourth position 64 may be in contact with third rake face 30. When seen in the direction perpendicular to seating surface 4, the width of fourth side surface 14 in the direction perpendicular to second cutting edge portion 2 may become wider as fourth side surface 14 extends from fourth position 64 toward fifth position 65, and may become narrower as fourth side surface 14 extends from fifth position 65 toward sixth position 66. Specifically, when seen in the direction perpendicular to seating surface 4, fourth side surface 14 may have a triangular shape.

When seen in the direction perpendicular to seating surface 4, the width of third side surface 13 in the direction perpendicular to second cutting edge portion 2 may become wider as third side surface 13 extends from fourth position 64 toward sixth position 66. When seen in the direction perpendicular to seating surface 4, the width of second rake face 20 in the direction perpendicular to second cutting edge portion 2 may become wider as second rake face 20 is further away from third rake face 30. From another viewpoint, it is said that when seen in the direction perpendicular to seating surface 4, a distance between second cutting edge portion 2 and protrusion 41 in the direction perpendicular to second cutting edge portion 2 may become larger as second cutting edge portion 2 is further away from corner cutting edge portion 3.

As shown in FIG. 4, when seen in the direction perpendicular to seating surface 4, each of front side surface 40 and upper surface 50 extends along a straight line (third straight line L3) bisecting an angle (fourth angle θ4) between a straight line (first straight line L1) along first cutting edge portion 1 and a straight line (second straight line L2) along second cutting edge portion 2. In the direction along third straight line L3, the width (third width D3) of third rake face 30 may be less than or equal to 0.5 mm. Third width D3 may be less than or equal to 0.45 mm. In the case where a first intersection 67 represents an intersection between third straight line L3 and corner cutting edge portion 3 and a second intersection 68 represents an intersection between third straight line L3 and a boundary line between third rake face 30 and front side surface 40, third width D3 is a length between first intersection 67 and second intersection 68. Fourth angle θ4 is 80°, for example. Fourth angle θ4 may be more than or equal to 35° and less than or equal to 90°, for example.

As shown in FIG. 4, when seen in the direction perpendicular to seating surface 4, the width (first width D1) of the boundary between front side surface 40 and third rake face 30 is larger than the width (second width D2) of the boundary between front side surface 40 and upper surface 50. The width of the boundary between front side surface 40 and third rake face 30 is a length between first position 61 and fourth position 64, for example. From another viewpoint, it is said that the width of the boundary between front side surface 40 and third rake face 30 is the width of the boundary between front side surface 40 and third rake face 30 in the direction perpendicular to third straight line L3. The width of the boundary between front side surface 40 and upper surface 50 is a length between second position 62 and fifth position 65, for example. From another viewpoint, it is said that the width of the boundary between front side surface 40 and upper surface 50 is the width of the boundary between front side surface 40 and upper surface 50 in the direction perpendicular to third straight line L3.

Figure 5:
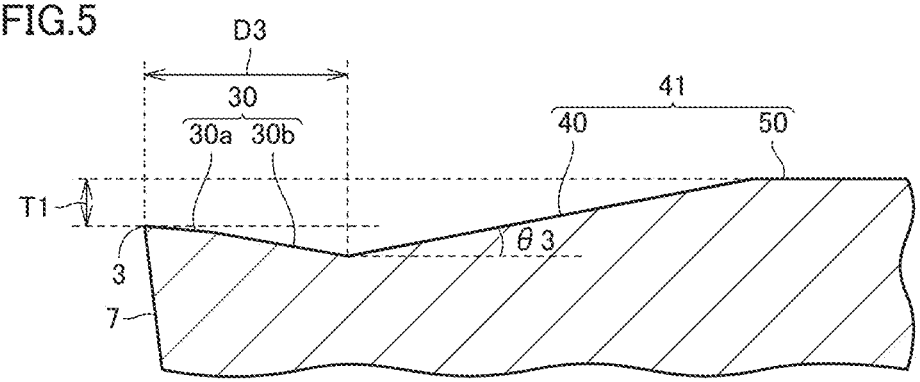
FIG. 5 is a schematic cross sectional view along a V-V line of FIG. 4.

FIG. 5 is a schematic cross sectional view along a V-V line of FIG. 4. The V-V line coincides with third straight line L3. As shown in FIG. 5, third rake face 30 has a first region 30a and a second region 30b. First region 30a is continuous to corner cutting edge portion 3. First region 30a is inclined relative to seating surface 4 so as to be closer to seating surface 4 as first region 30a is further away from corner cutting edge portion 3. Second region 30b is located between first region 30a and front side surface 40. Second region 30b is continuous to first region 30a. Second region 30b is inclined relative to seating surface 4 so as to be closer to seating surface 4 as second region 30b is further away from first region 30a.

In the direction perpendicular to seating surface 4, upper surface 50 is at a position higher than corner cutting edge portion 3. From another viewpoint, it is said that in the direction perpendicular to seating surface 4, a distance between upper surface 50 and a plane along seating surface 4 is longer than a distance between corner cutting edge portion 3 and the plane along seating surface 4. In the direction perpendicular to seating surface 4, a distance (first distance T1) between corner cutting edge portion 3 and upper surface 50 is 0.12 mm, for example. An inclination angle (third inclination angle θ3) of front side surface 40 relative to seating surface 4 is 10°, for example. Third inclination angle θ3 may be more than or equal to 7° and less than or equal to 13°, for example.

Figure 6:
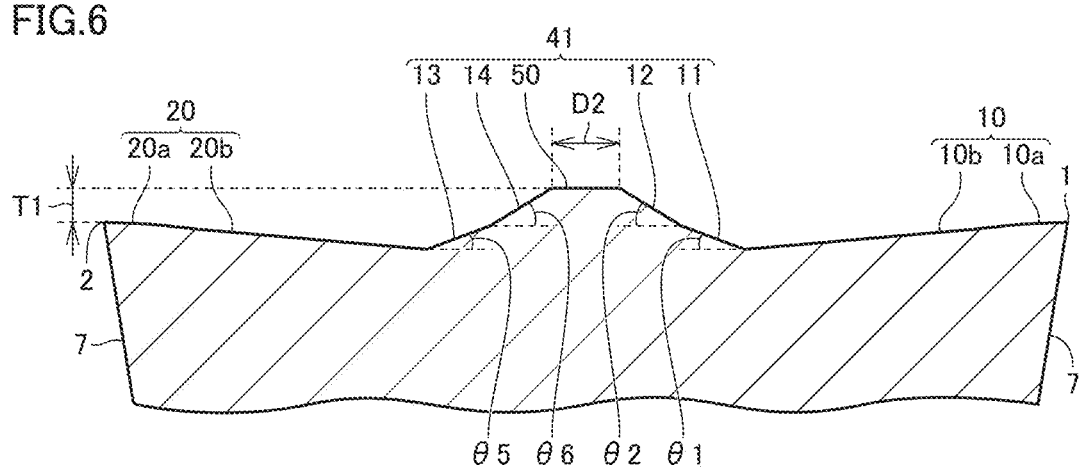
FIG. 6 is a schematic cross sectional view along a VI-VI line of FIG. 4.

FIG. 6 is a schematic cross sectional view along a VI-VI line of FIG. 4. The cross section shown in FIG. 6 is a cross section that is perpendicular to seating surface 4 and that is perpendicular to the straight line (straight line L3) bisecting the angle between the straight line along first cutting edge portion 1 and the straight line along second cutting edge portion 2. The cross section shown in FIG. 6 crosses upper surface 50.

As shown in FIG. 6, each of second side surface 12 and fourth side surface 14 is continuous to upper surface 50. Upper surface 50 is located between second side surface 12 and fourth side surface 14. In the direction perpendicular to seating surface 4, upper surface 50 is at a position higher than each of first cutting edge portion 1 and second cutting edge portion 2. In the direction perpendicular to seating surface 4, the distance between first cutting edge portion 1 and upper surface 50 is substantially the same as the distance (first distance T1) between corner cutting edge portion 3 and upper surface 50. In the direction perpendicular to seating surface 4, the distance between second cutting edge portion 2 and upper surface 50 is substantially the same as the distance (first distance T1) between corner cutting edge portion 3 and upper surface 50.

As shown in FIG. 6, first rake face 10 has a third region 10a and a fourth region 10b. Third region 10a is continuous to first cutting edge portion 1. Third region 10a is inclined relative to seating surface 4 so as to be closer to seating surface 4 as third region 10a is further away from first cutting edge portion 1. Fourth region 10b is located between first region 30a and first side surface 11. Fourth region 10b is continuous to third region 10a. Fourth region 10b is inclined relative to seating surface 4 so as to be closer to seating surface 4 as fourth region 10b is further away from third region 10a.

First side surface 11 is continuous to fourth region 10b. First side surface 11 rises from fourth region 10b. First side surface 11 is inclined relative to seating surface 4 so as to be further away from seating surface 4 as first side surface 11 is further away from fourth region 10b. An inclination angle (first inclination angle θ1) of first side surface 11 relative to seating surface 4 is 22°, for example. First inclination angle θ1 may be more than or equal to 17° and less than or equal to 27°, for example.

Second side surface 12 is continuous to first side surface 11. Second side surface 12 rises from first side surface 11. Second side surface 12 is inclined relative to seating surface 4 so as to be further away from seating surface 4 as second side surface 12 is further away from first side surface 11. An inclination angle (second inclination angle θ2) of second side surface 12 relative to seating surface 4 is 32°, for example. Second inclination angle θ2 may be more than or equal to 28° and less than or equal to 45°, for example. Second inclination angle θ2 may be larger than first inclination angle θ1.

Second rake face 20 has a fifth region 20a and a sixth region 20b. Fifth region 20a is continuous to second cutting edge portion 2. Fifth region 20a is inclined relative to seating surface 4 so as to be closer to seating surface 4 as fifth region 20a is further away from second cutting edge portion 2. Sixth region 20b is located between fifth region 20a and third side surface 13. Sixth region 20b is continuous to fifth region 20a. Sixth region 20b is inclined relative to seating surface 4 so as to be closer to seating surface 4 as sixth region 20b is further away from fifth region 20a.

Third side surface 13 is continuous to sixth region 20b. Third side surface 13 rises from sixth region 20b. Third side surface 13 is inclined relative to seating surface 4 so as to be further away from seating surface 4 as third side surface 13 is further away from sixth region 20b. An inclination angle (fifth inclination angle θ5) of third side surface 13 relative to seating surface 4 is 22°, for example. Fifth inclination angle θ5 is substantially the same as first inclination angle θ1.

Fourth side surface 14 is continuous to third side surface 13. Fourth side surface 14 rises from third side surface 13. Fourth side surface 14 is inclined relative to seating surface 4 so as to be further away from seating surface 4 as fourth side surface 14 is further away from third side surface 13. An inclination angle (sixth inclination angle θ6) of fourth side surface 14 relative to seating surface 4 is 32°, for example. Sixth inclination angle θ6 is substantially the same as second inclination angle θ2. Sixth inclination angle θ6 may be larger than fifth inclination angle θ5.

Figure 7:
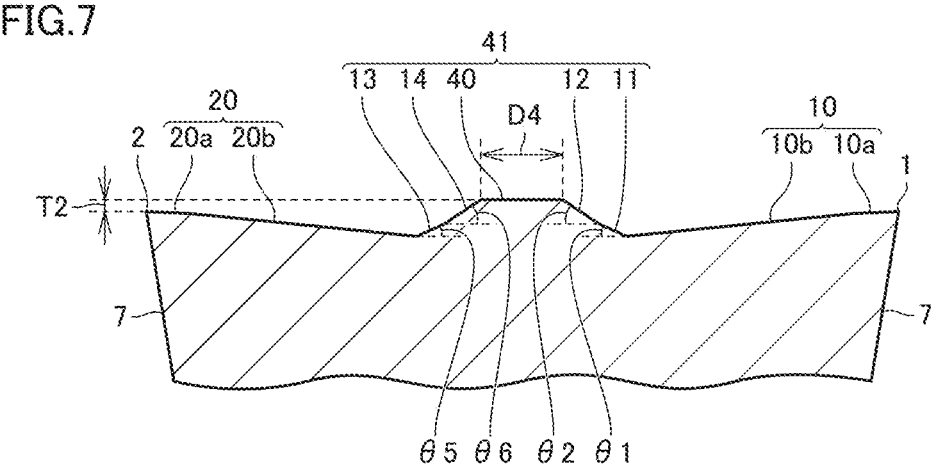
FIG. 7 is a schematic cross sectional view along a VII-VII line of FIG. 4.

FIG. 7 is a schematic cross sectional view along a VII-VII line of FIG. 4. The cross section shown in FIG. 7 is a cross section that is perpendicular to seating surface 4 and that is perpendicular to the straight line (third straight line L3) bisecting the angle between the straight line along first cutting edge portion 1 and the straight line along second cutting edge portion 2. The cross section shown in FIG. 7 is at a position crossing front side surface 40.

As shown in FIG. 7, each of second side surface 12 and fourth side surface 14 is continuous to front side surface 40. Front side surface 40 is located between second side surface 12 and fourth side surface 14. When seen in the direction perpendicular to seating surface 4, in the direction perpendicular to third straight line L3, the width (fourth width D4) of front side surface 40 may be larger than the width (second width D2) of upper surface 50. In the direction perpendicular to seating surface 4, front side surface 40 has a portion at a position higher than each of first cutting edge portion 1 and second cutting edge portion 2. In the direction perpendicular to seating surface 4, a distance (second distance T2) between first cutting edge portion 1 and front side surface 40 is less than or equal to a distance (first distance T1) between first cutting edge portion 1 and upper surface 50. Likewise, in the direction perpendicular to seating surface 4, a distance (second distance T2) between second cutting edge portion 2 and front side surface 40 is less than or equal to a distance (first distance T1) between second cutting edge portion 2 and upper surface 50.

Next, the following describes a swarf process when a workpiece is turned using cutting insert 100 according to the present embodiment.

Figure 8:
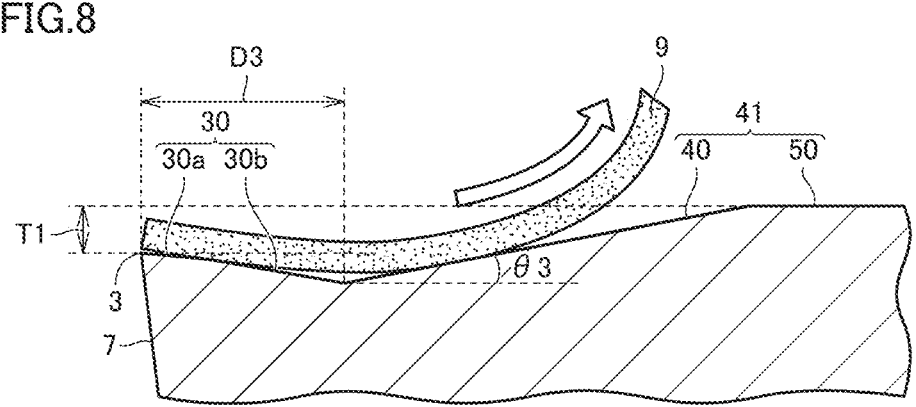
FIG. 8 is a schematic view showing a flow of swarf in a cross section along a third straight line.

FIG. 8 is a schematic view showing a flow of swarf in a cross section along the third straight line. As shown in FIG. 8, in the cross section along third straight line L3, swarf 9 is moved along third rake face 30, is then constrained by front side surface 40, and is accordingly curled. By constraining swarf 9 by wide front side surface 40, swarf 9 can be distorted while preventing vibration of swarf 9. Accordingly, swarf 9 can be cut at an appropriate length.

Figure 9:
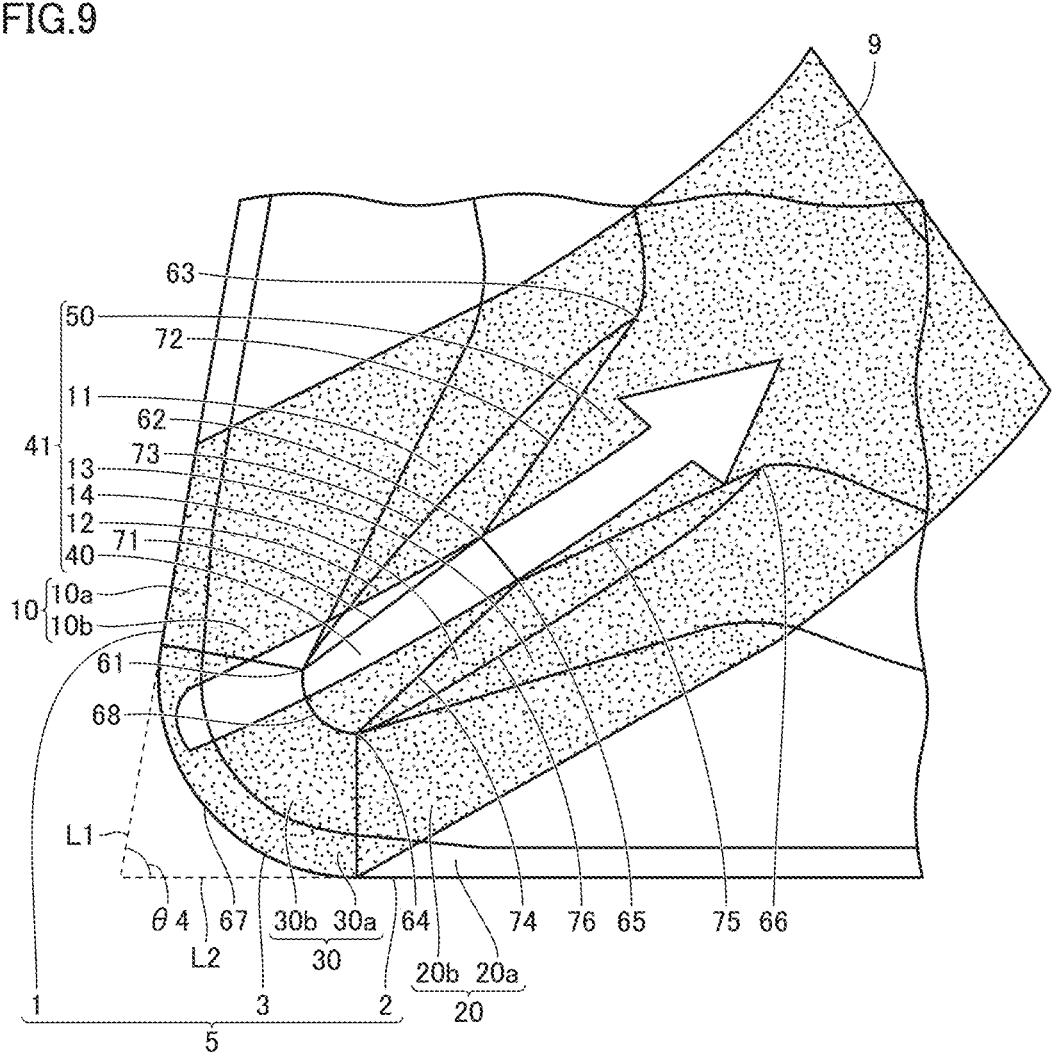
FIG. 9 is a schematic view showing a flow of swarf when a workpiece is turned under a high cut-in condition.

FIG. 9 is a schematic view showing a flow of swarf when a workpiece is turned under a high cut-in condition. An arrow in FIG. 9 represents a flow of swarf 9. According to cutting insert 100 according to the present embodiment, at protrusion 41 far from the cutting edge, swarf 9 is smoothly discharged along first side surface 11 and second side surface 12 of protrusion 41 without running onto protrusion 41. When each of first angle θ1 and second angle θ2 is small (specifically, when each of first angle θ1 and second angle θ2 falls within the above-described range), swarf 9 is discharged more smoothly. Moreover, according to cutting insert 100 according to the present embodiment, at protrusion 41 close to the cutting edge, swarf 9 is smoothly discharged along front side surface 40 of protrusion 41. When the height from third rake face 30 to the top of protrusion 41 is low (specifically, when first distance T1 falls within the above-described range), swarf 9 is likely to be discharged more smoothly.

Figure 10:
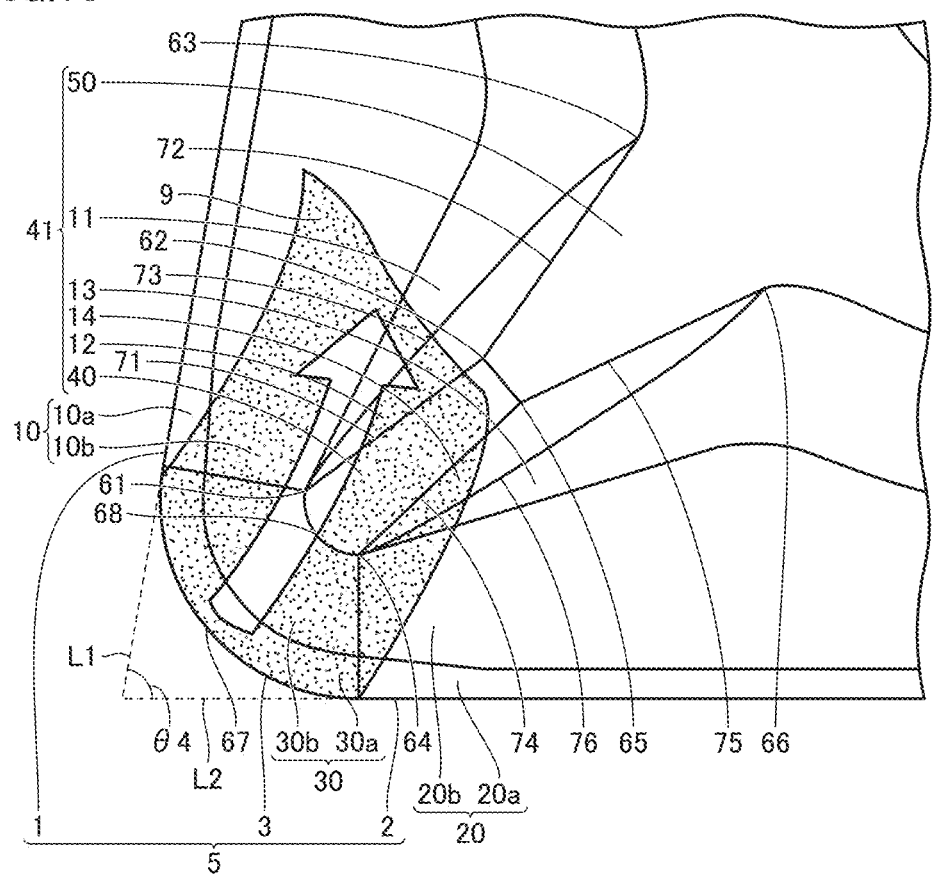
FIG. 10 is a schematic view showing a flow of swarf when a workpiece is turned under a low cut-in condition.

FIG. 10 is a schematic view showing a flow of swarf when a workpiece is turned under a low cut-in condition. An arrow in FIG. 10 represents a flow of swarf 9. According to cutting insert 100 according to the present embodiment, at protrusion 41 close to the cutting edge, swarf 9 is smoothly discharged along front side surface 40 of protrusion 41. When the lateral width of front side surface 40 is large, the height of protrusion 41 is large, and the inclination angle of front side surface 40 is large (specifically, when first width D1, first distance T1, and third inclination angle θ3 falls within the above-described respective ranges), swarf 9 is more constrained by protrusion 41 and is therefore more likely to be cut.

Next, the following describes function and effect of cutting insert 100 according to the present embodiment.

The shape of protrusion 41 in the vicinity of the cutting edge as required for the process under the high cut-in condition is different from the shape of protrusion 41 in the vicinity of the cutting edge as required for the process under the low cut-in condition. This makes it difficult to attain versatility. According to cutting insert 100 according to the present embodiment, the shape of protrusion 41 is configured as follows. Specifically, second side surface 12 is located opposite to first rake face 10 relative to first side surface 11, is inclined relative to first side surface 11, and is continuous to each of first side surface 11, front side surface 40, and upper surface 50. The ridgeline between first side surface 11 and second side surface 12 is continuous to upper surface 50. When seen in the direction perpendicular to seating surface 4, the width of the boundary between front side surface 40 and third rake face 30 is larger than the width of the boundary between front side surface 40 and upper surface 50. Accordingly, versatility for process conditions can be improved. Specifically, in the process under the high cut-in condition, swarf 9 is discharged smoothly along protrusion 41 without running onto protrusion 41, whereas in the process under the low cut-in condition, swarf 9 can be facilitated to be cut.

As a feed rate becomes larger, the thickness of swarf 9 becomes larger. For example, when the feed rate is 0.3 mm/revolution, the thickness of the swarf is about 0.3 mm. According to cutting insert 100 according to the present embodiment, in the cross section that is perpendicular to seating surface 4 and that is perpendicular to the straight line bisecting the angle between the straight line along first cutting edge portion 1 and the straight line along second cutting edge portion 2, the inclination angle of second side surface 12 relative to seating surface 4 may be larger than the inclination angle of first side surface 11 relative to seating surface 4. Accordingly, swarf 9 can be distorted gradually. As a result, even when the thickness of swarf 9 is large, swarf 9 can be cut effectively.

Further, according to cutting insert 100 according to the present embodiment, in the direction along the straight line bisecting the angle between the straight line along first cutting edge portion 1 and the straight line along second cutting edge portion 2, the width of third rake face 30 may be less than or equal to 0.5 mm. Accordingly, swarf 9 can be more constrained. As a result, swarf 9 can be facilitated to be cut.

Example 1

(Preparation of Samples)

First, cutting inserts 100 according to samples 1 and 2 were prepared. Cutting insert 100 according to sample 1 has the shape shown in FIG. 4 to FIG. 6. As shown in FIG. 4, at protrusion 41 of cutting insert 100 according to sample 1, first width D1 of front side surface 40 is larger than second width D2. Specifically, first width D1 is 0.4 mm. Second width D2 is 0.25 mm. As shown in FIG. 5, third inclination angle θ3 of front side surface 40 is 10°. As shown in FIG. 6, protrusion 41 of cutting insert 100 according to sample 1 has first side surface 11 having first inclination angle θ1, and second side surface 12 having second inclination angle θ2. First inclination angle θ1 of first side surface 11 is 22°. Second inclination angle θ2 of second side surface 12 is 32°.

Figure 11:
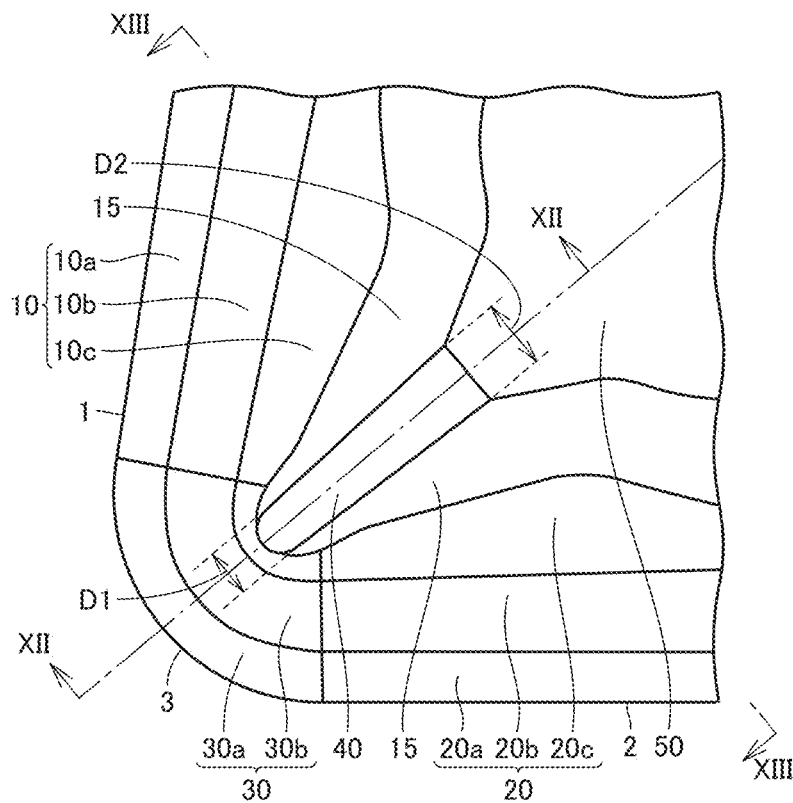
FIG. 11 is a schematic plan view showing a configuration of a cutting insert according to a sample 2.
Figure 12:
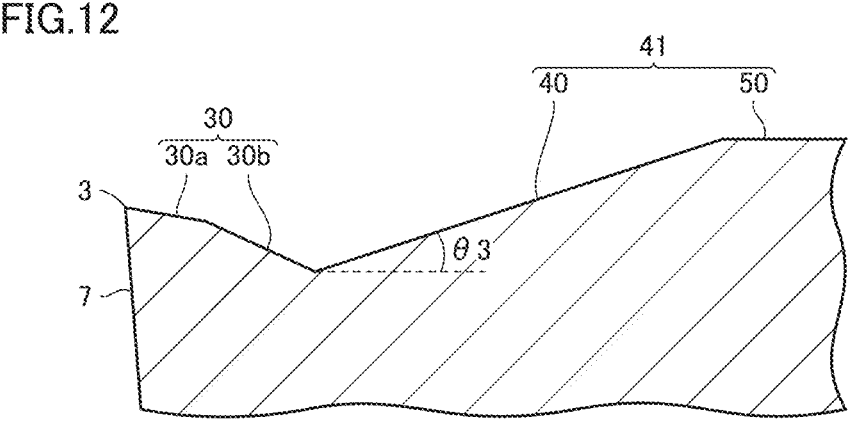
FIG. 12 is a schematic cross sectional view along a XII-XII line of FIG. 11.
Figure 13:
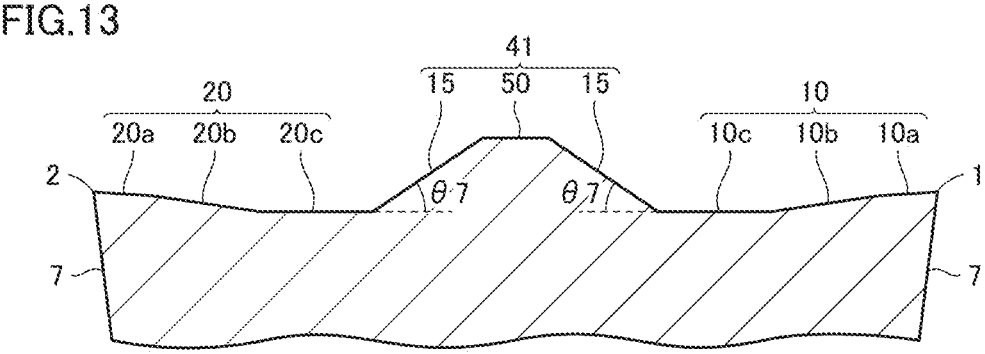
FIG. 13 is a schematic cross sectional view along a XIII-XIII line of FIG. 11.

On the other hand, cutting insert 100 according to sample 2 has a shape shown in FIG. 11 to FIG. 13. FIG. 11 is a schematic plan view showing a configuration of the cutting insert according to sample 2. FIG. 12 is a schematic cross sectional view along a XII-XII line of FIG. 11. FIG. 13 is a schematic cross sectional view along a XIII-XIII line of FIG. 11. As shown in FIG. 11, at protrusion 41 of cutting insert 100 according to sample 2, first width D1 of front side surface 40 is smaller than second width D2. Specifically, first width D1 is 0.16 mm. Second width D2 is 0.20 mm. As shown in FIG. 12, third inclination angle θ3 of front side surface 40 is 11°. As shown in FIG. 13, protrusion 41 of cutting insert 100 according to sample 2 has fifth side surface 15 having a single inclination angle. A seventh inclination angle θ7 of fifth side surface 15 is 30°.

(Evaluation Method)

A workpiece was turned using each of cutting inserts 100 according to samples 1 and 2. The material of the workpiece was SCM415. A cutting rate (Vc) was set to 200 m/minute. Oil was externally supplied. A feed rate (f) was set to 0.10 mm/revolution, 0.15 mm/revolution, 0.20 mm/revolution, 0.25 mm/revolution and 0.30 mm/revolution. An amount of depth of cut (ap) was set to 0.5 mm, 0.8 mm, 1.0 mm, and 1.5 mm.

(Evaluation Result)

Figure 14:
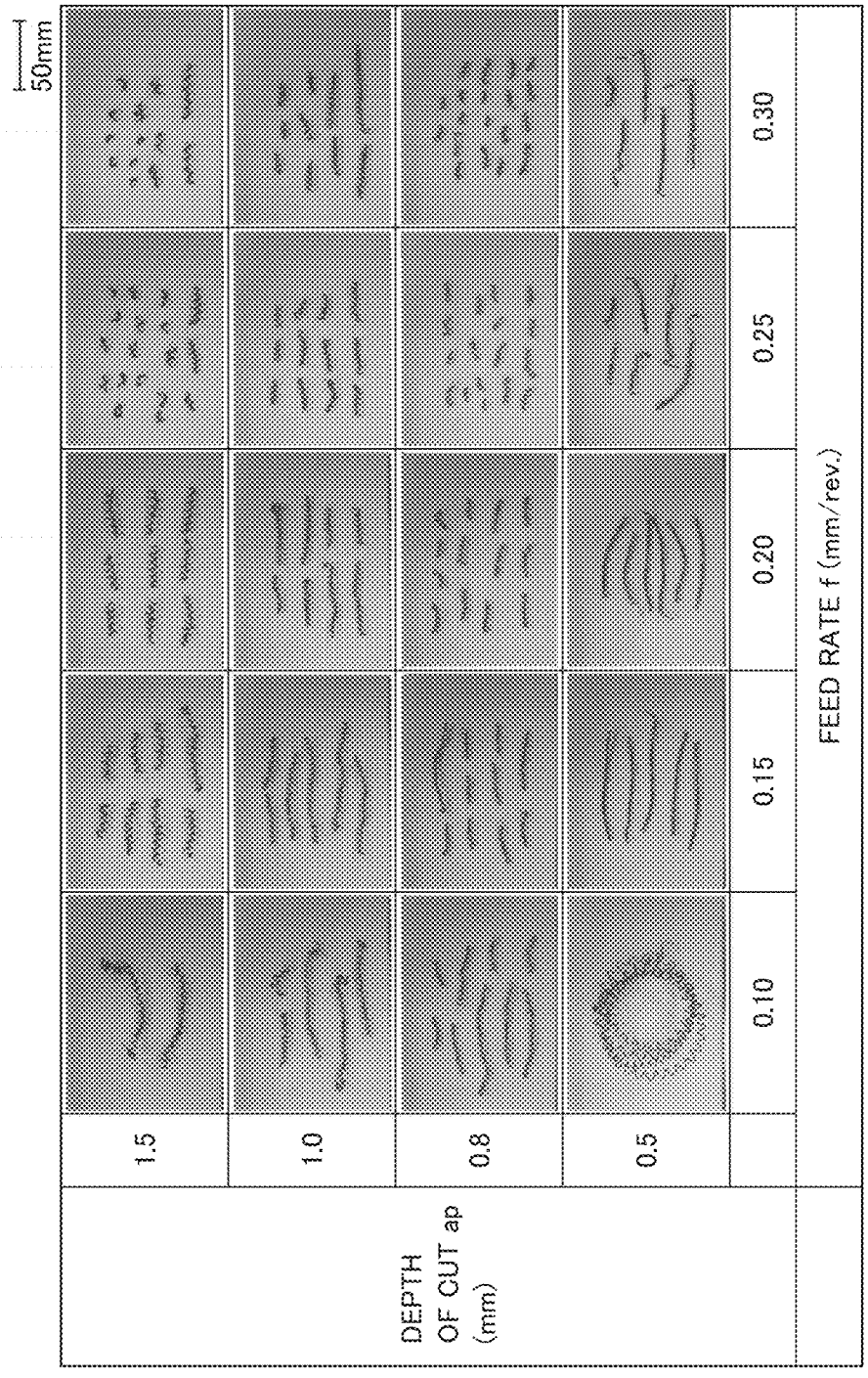
FIG. 14 shows shapes of pieces of swarf when a workpiece is turned using a cutting insert according to a sample 1.
Figure 15:
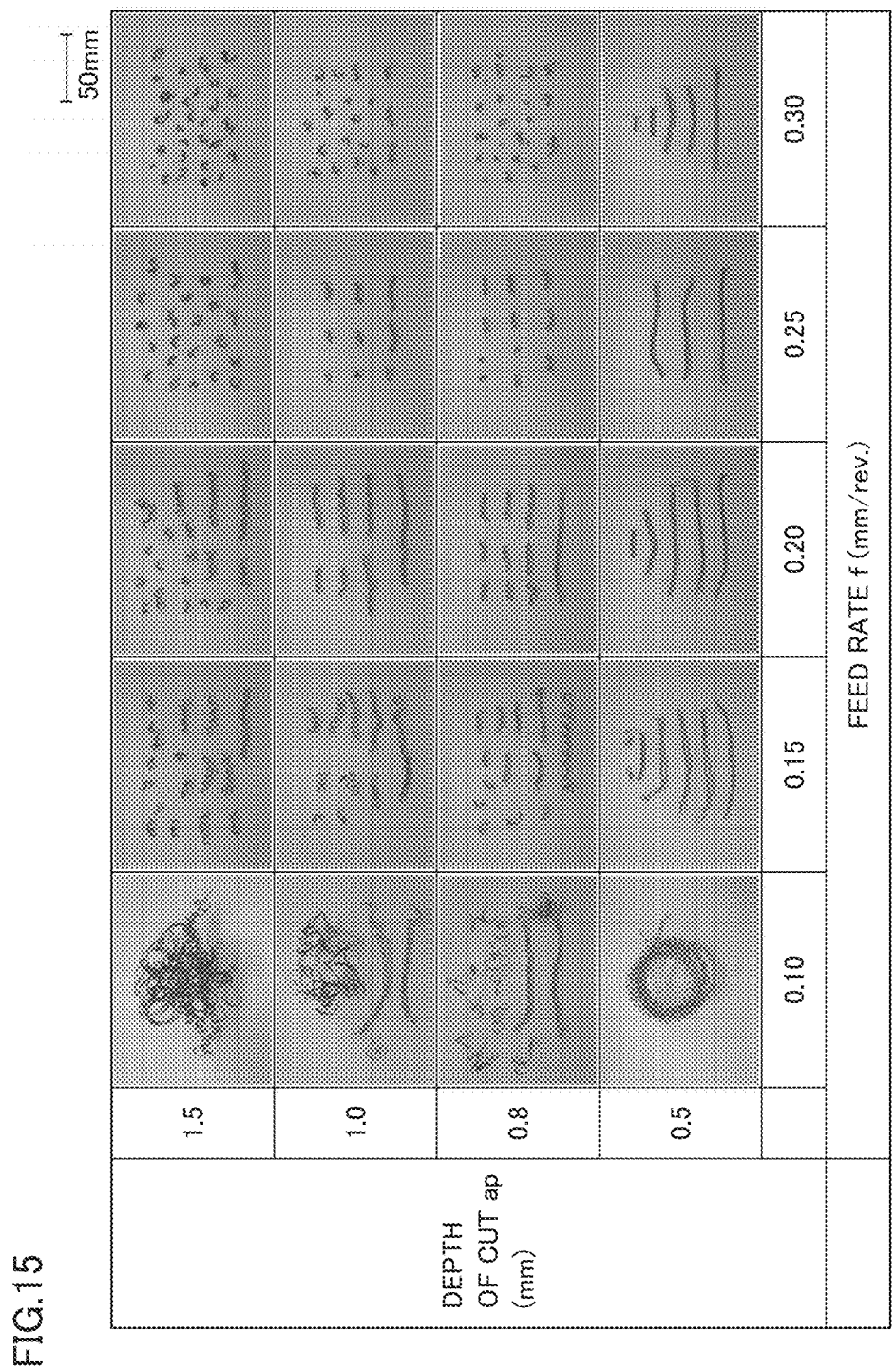
FIG. 15 shows shapes of pieces of swarf when a workpiece is turned using the cutting insert according to sample 2.

FIG. 14 shows shapes of pieces of swarf when a workpiece was turned using the cutting insert according to sample 1. FIG. 15 shows shapes of pieces of swarf when the workpiece was turned using the cutting insert according to sample 2.

As shown in FIG. 14, in the case where cutting insert 100 according to sample 1 was used, although swarf 9 was not cut short under a condition that the feed rate was 0.10 mm/revolution and the amount of depth of cut (ap) was 0.5 mm, swarf 9 was cut short under the other conditions. On the other hand, as shown in FIG. 15, in the case where cutting insert 100 according to sample 2 was used, swarf 9 was not cut short under conditions that the feed rate was 0.10 mm/revolution and the amount of depth of cut (ap) was more than or equal to 0.5 mm and less than or equal to 1.5 mm. Under the other conditions, swarf 9 was cut short but variation in length among the pieces of swarf 9 was large (particularly, see a case where the feed rate was 0.15 mm/revolution and the amount of depth of cut (ap) was 0.8 mm and a case where the feed rate was 0.20 mm/revolution and the amount of depth of cut (ap) was 1.5 mm). In view of the above result, it was confirmed that versatility for process conditions can be improved by cutting insert 100 according to sample 1 as compared with cutting insert 100 according to sample 2.

Example 2

(Preparation of Samples)

Figure 16:
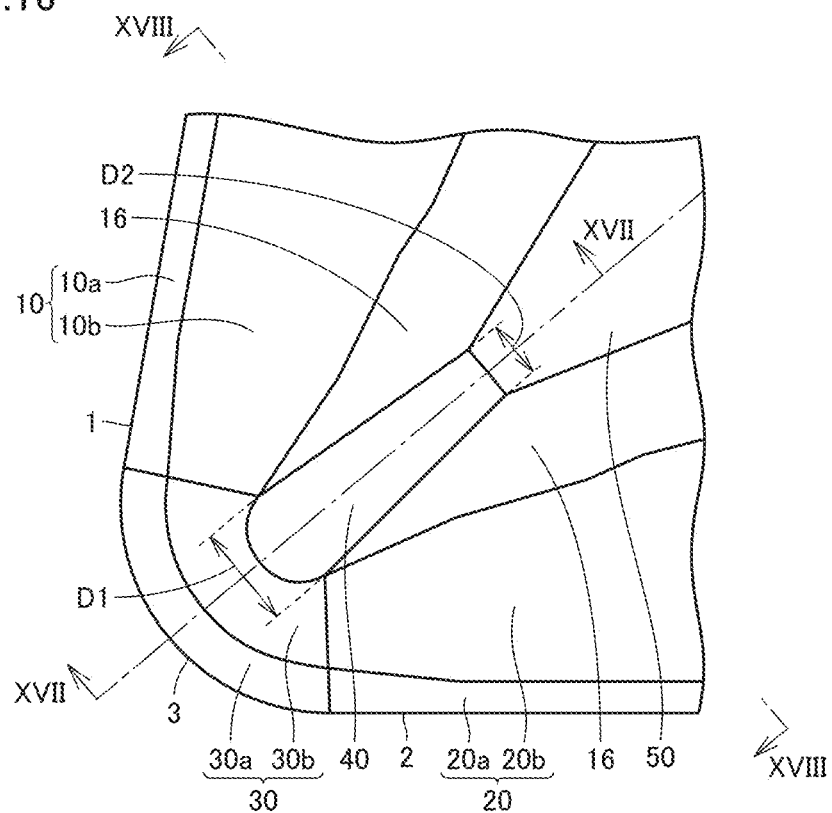
FIG. 16 is a schematic plan view showing a configuration of a cutting insert according to a sample 3.
Figure 17:
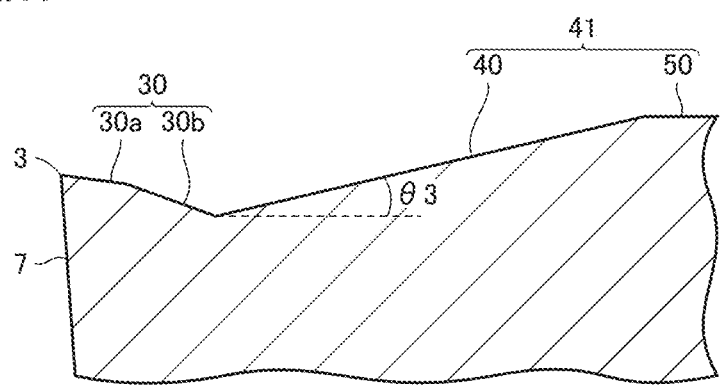
FIG. 17 is a schematic cross sectional view along a XVII-XVII line of FIG. 16.
Figure 18:
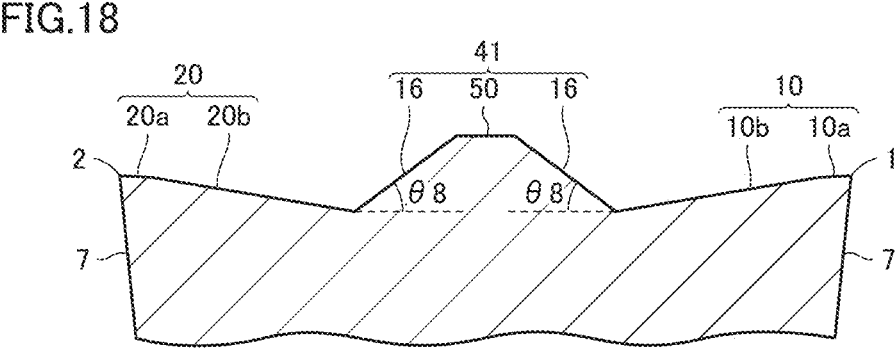
FIG. 18 is a schematic cross sectional view along a XVIII-XVIII line of FIG. 16.

Next, cutting inserts 100 according to samples 1 to 3 were prepared. Cutting inserts 100 according to samples 1 and 2 were the same as those described above. Cutting insert 100 according to sample 3 has a shape shown in FIG. 16 to FIG. 18. FIG. 16 is a schematic plan view showing a configuration of the cutting insert according to sample 3. FIG. 17 is a schematic cross sectional view along a XVII-XVII line of FIG. 16. FIG. 18 is a schematic cross sectional view along a XVIII-XVIII line of FIG. 16. As shown in FIG. 16, at protrusion 41 of cutting insert 100 according to sample 3, first width D1 of front side surface 40 is larger than second width D2. Specifically, first width D1 is 0.4 mm. Second width D2 is 0.25 mm. As shown in FIG. 17, third inclination angle θ3 of front side surface 40 is 11°. As shown in FIG. 18, protrusion 41 of cutting insert 100 according to sample 3 has a sixth side surface 16 having a single inclination angle. An eighth inclination angle θ8 of sixth side surface 16 is 26°.

(Analysis Condition)

Figure 19:
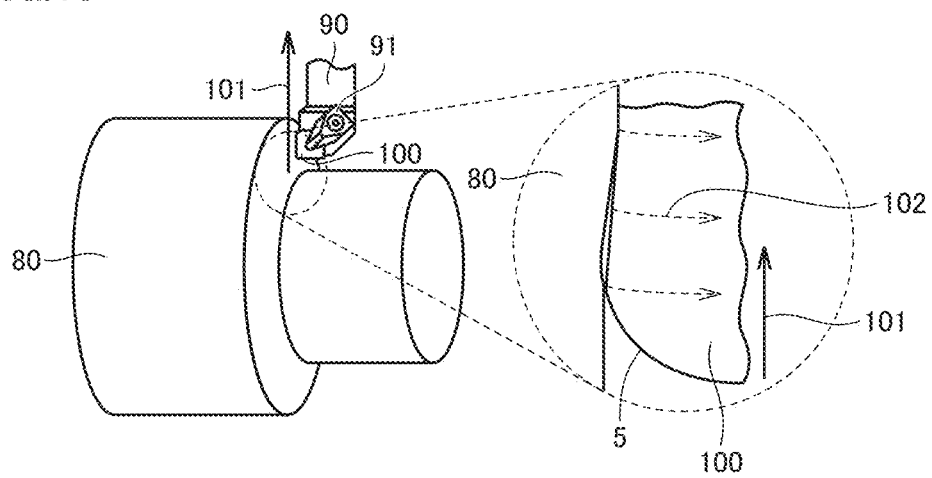
FIG. 19 is a schematic view showing a state in which a workpiece is processed using the cutting insert by raising the cutting insert on and along an end surface of the workpiece.

CAE (Computer Aided Engineering) simulation employing a finite element method was used to analyze shapes of pieces of swarf when a workpiece was processed using each of cutting inserts 100 according to samples 1 to 3 by raising cutting insert 100 on and along an end surface of the workpiece. FIG. 19 is a schematic view showing a state in which the workpiece is processed using the cutting insert by raising the cutting insert on and along the end surface of the workpiece. In FIG. 19, a first arrow 101 represents a traveling direction of cutting insert 100. Each of second arrows 102 represents a flow direction of swarf. Cutting insert 100 is attached to holder 90. A pressing portion 91 presses cutting insert 100 onto holder 90. The material of workpiece 80 was S45C. A cutting rate (Vc) was set to 200 m/minute. A feed rate (f) was set to 0.2 mm/revolution. An amount of depth of cut (ap) was 0.2 mm.

(Analysis Result)

Figure 20:
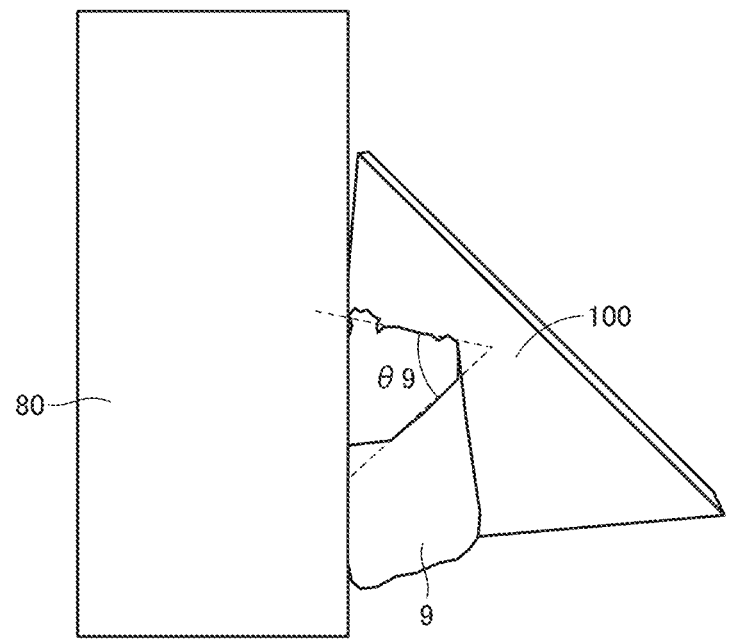
FIG. 20 is a schematic view showing a shape of swarf when processed using the cutting insert according to sample 1 by raising the cutting insert on and along the end surface.
Figure 21:
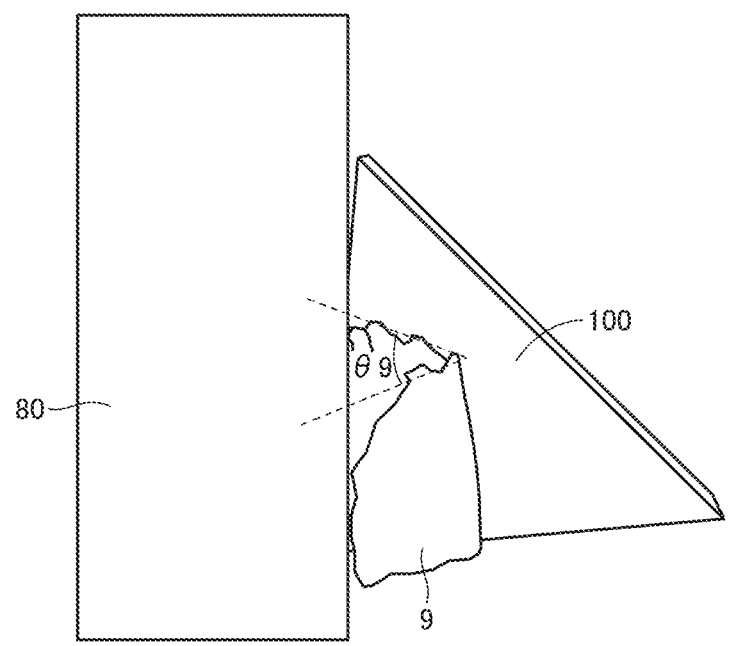
FIG. 21 is a schematic view showing a shape of swarf when processed using the cutting insert according to sample 2 by raising the cutting insert on and along the end surface.
Figure 22:
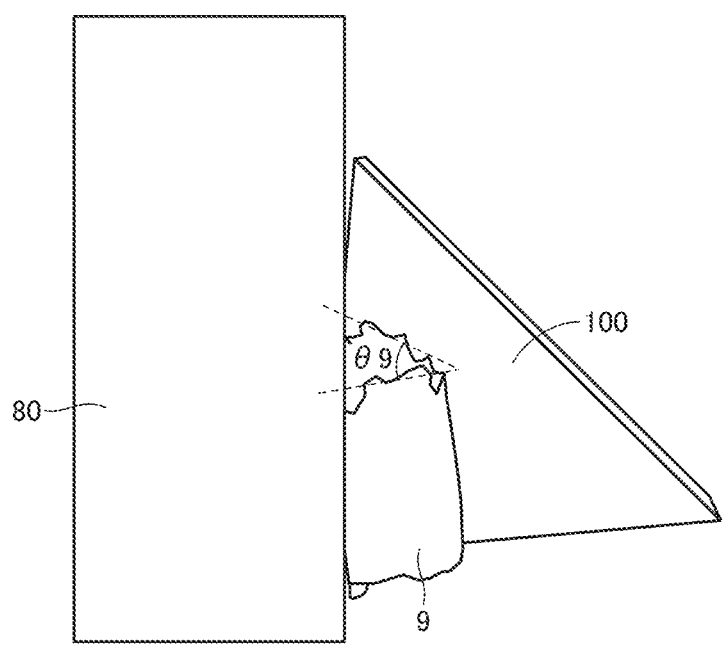
FIG. 22 is a schematic view showing a shape of swarf when processed using the cutting insert according to sample 3 by raising the cutting insert on and along the end surface.

FIG. 20 is a schematic view showing a shape of swarf when processed using the cutting insert according to sample 1 by raising the cutting insert on and along the end surface. FIG. 21 is a schematic view showing a shape of swarf when processed using the cutting insert according to sample 2 by raising the cutting insert on and along the end surface. FIG. 22 is a schematic view showing a shape of swarf when processed using the cutting insert according to sample 3 by raising the cutting insert on and along the end surface. For discharging of the swarf, swarf 9 is desirably curled to be positionally slightly deviated in the lateral direction (the extending direction of first cutting edge portion 1), rather than being curled to be at the same position.

As shown in FIG. 20, when cutting insert 100 according to sample 1 was used, swarf 9 was laterally curled at a large degree. An angle (ninth inclination angle θ9) of the lateral curl was about 57°. As shown in FIG. 21, when cutting insert 100 according to sample 2 was used, swarf 9 was curled laterally at a medium degree. An angle (ninth inclination angle θ9) of the lateral curl was about 45°. As shown in FIG. 22, when cutting insert 100 according to sample 3 was used, swarf 9 was laterally curled at a small degree. An angle (ninth inclination angle θ9) of the lateral curl was about 37°. In view of the above result, it was confirmed that the lateral curl can be facilitated by cutting insert 100 according to sample 1 as compared with cutting insert 100 according to each of samples 2 and 3. By facilitating the lateral curl, swarf 9 is constrained by top surface 6 of cutting insert 100, whereby swarf 9 can be facilitated to be cut.

It should be noted that under the condition that the feed rate was 0.10 mm/revolution and the amount of depth of cut (ap) was 1.5 mm, swarf 9 was not cut short in the case where cutting insert 100 according to sample 2 was used but swarf 9 was cut short in the case where cutting insert 100 according to sample 1 was used (see FIG. 14 and FIG. 15). As compared with the case where cutting insert 100 according to sample 2 was used, it is considered that swarf 9 could be cut short because the lateral curl was more facilitated in the case where cutting insert 100 according to sample 1 was used.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: first cutting edge portion; 2: second cutting edge portion; 3: corner cutting edge portion; 4: seating surface; 5: cutting edge; 6: top surface; 7: outer peripheral surface; 8: mounting hole; 9: swarf; 10: first rake face; 10a: third region; 10b: fourth region; 11: first side surface; 12: second side surface; 13: third side surface; 14: fourth side surface; 15: fifth side surface; 16: sixth side surface; 20: second rake face; 20a: fifth region; 20b: sixth region; 30: third rake face; 30a: first region; 30b: second region; 40: front side surface; 41: protrusion; 50: upper surface; 61: first position; 62: second position; 63: third position; 64: fourth position; 65: fifth position; 66: sixth position; 67: first intersection; 68: second intersection; 71: first ridgeline; 72: second ridgeline; 73: third ridgeline; 74: fourth ridgeline; 75: fifth ridgeline; 76: sixth ridgeline; 80: workpiece; 90: holder; 91: pressing portion; 100: cutting insert; 101: first arrow; 102: second arrow; D1: first width; D2: second width; D3: third width; D4: fourth width; L1: first straight line; L2: second straight line; L3: third straight line; T1: first distance; T2: second distance; θ1: first inclination angle; θ2: second inclination angle; θ3: third inclination angle; θ4: fourth inclination angle; θ5: fifth inclination angle; θ6: sixth inclination angle; θ7: seventh inclination angle; θ8: eighth inclination angle; θ9: ninth inclination angle.

The invention claimed is:

1. A cutting insert comprising:
a top surface;
a seating surface located opposite to the top surface; and
an outer peripheral surface continuous to each of the top surface and the seating surface, wherein
a ridgeline between the top surface and the outer peripheral surface constitutes a cutting edge,
the cutting edge includes
a corner cutting edge portion having a curved shape,
a first cutting edge portion having a straight shape and continuous to one end of the corner cutting edge portion, and
a second cutting edge portion having a straight shape and continuous to the other end of the corner cutting edge portion,
the top surface includes
a first rake face continuous to the first cutting edge portion,
a second rake face continuous to the second cutting edge portion,
a third rake face continuous to the corner cutting edge portion and continuous to each of the first rake face and the second rake face,
a front side surface located opposite to the corner cutting edge portion relative to the third rake face, the front side surface rising from the third rake face,
an upper surface located opposite to the third rake face relative to the front side surface, the upper surface being continuous to the front side surface,
a first side surface located opposite to the first cutting edge portion relative to the first rake face, the first side surface rising from the first rake face, and
a second side surface located opposite to the first rake face relative to the first side surface, the second side surface being inclined relative to the first side surface, the second side surface being continuous to each of the first side surface, the front side surface, and the upper surface,
a ridgeline between the first side surface and the second side surface is continuous to the upper surface,
when seen in a direction perpendicular to the seating surface, a width of a boundary between the front side surface and the third rake face is larger than a width of a boundary between the front side surface and the upper surface, and
the boundary between the front side surface and the third rake face is at the lowest position in the direction perpendicular to the seating surface.

2. The cutting insert according to claim 1, wherein in a cross section that is perpendicular to the seating surface and that is perpendicular to a straight line bisecting an angle between a straight line along the first cutting edge portion and a straight line along the second cutting edge portion, an inclination angle of the second side surface relative to the seating surface is larger than an inclination angle of the first side surface relative to the seating surface.

3. The cutting insert according to claim 1, wherein in a case where a first position represents a point at which the front side surface, the first side surface, and the second side surface cross one another, a second position represents a point at which the front side surface, the second side surface, and the upper surface cross one another, and a third position represents a point at which the first side surface, the second side surface, and the upper surface cross one another, when seen in the direction perpendicular to the seating surface, a width of the second side surface in a direction perpendicular to the first cutting edge portion becomes wider as the second side surface extends from the first position toward the second position, and becomes narrower as the second side surface extends from the second position toward the third position.

4. The cutting insert according to claim 3, wherein when seen in the direction perpendicular to the seating surface, a width of the first side surface in the direction perpendicular to the first cutting edge portion becomes wider as the first side surface extends from the first position toward the third position.

5. The cutting insert according to claim 1, wherein when seen in the direction perpendicular to the seating surface, a width of the first rake face in a direction perpendicular to the first cutting edge portion becomes wider as the first rake face is further away from the third rake face.

6. The cutting insert according to claim 1, wherein in a direction along a straight line bisecting an angle between a straight line along the first cutting edge portion and a straight line along the second cutting edge portion, a width of the third rake face is less than or equal to 0.5 mm.

* * * * *